Feb. 9, 1954 W. I. JONES 2,668,340
SNAP FASTENER ASSEMBLY
Filed May 25, 1950
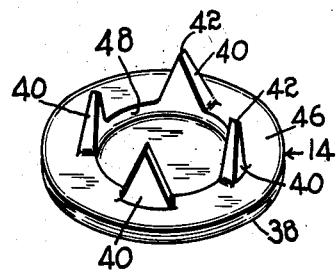
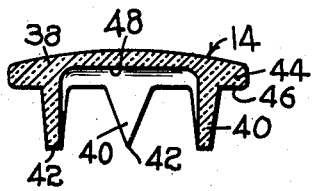
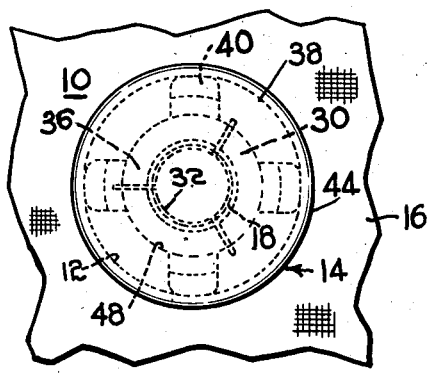
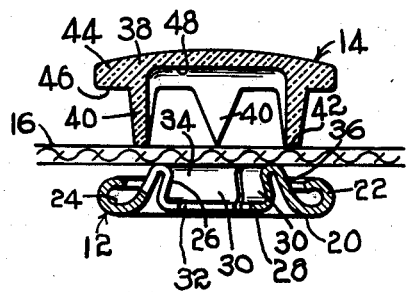
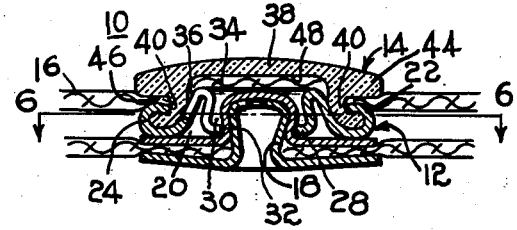
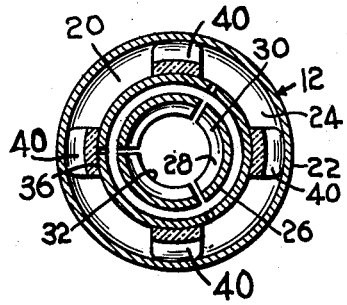
INVENTOR:
WALTER I. JONES,
BY Robert E Ross
AGENT.

Patented Feb. 9, 1954

2,668,340

UNITED STATES PATENT OFFICE 2,668,340

SNAP FASTENER ASSEMBLY

Walter I. Jones, Belmont, Mass., assignor to United-Carr Fastener Corporation, Cambridge, Mass., a corporation of Massachusetts Application May 25, 1950, Serial No. 164,143

4 Claims. (Cl. 24—216)

This invention relates generally to snap fasteners, and has particular reference to an attaching member for securing snap fastener members to articles of clothing or the like.

The object of the invention is to provide an improved attaching member for securing a snap fastener member to a supporting sheet, in which the attaching member is formed of a single piece of molded synthetic organic plastic.

A further object of the invention is to provide a snap fastener half comprising a fastening member and an attaching member in which the attaching member is formed of molded polyamide plastic and is provided with flexible attaching prongs adapted to pierce a supporting sheet for engagement with prong-receiving means disposed on the fastener member.

A further object of the invention is to provide a molded synthetic plastic attaching member for securing a fastener member to a supporting sheet having a solid base provided with integral attaching prongs extending downwardly therefrom in spaced relation to the edge of the base, in which the base is provided with a recess disposed centrally of the attaching prongs to receive a portion of the fastener member when the parts are assembled.

These and other objects and advantages of the invention will be apparent to persons skilled in the art to which the invention pertains from a consideration of the accompanying drawings and annexed specification illustrating and describing a preferred construction embodying the invention.

In the drawings:

Fig. 1 is a perspective view of an attaching member embodying the features of the invention;

Fig. 2 is a view in section of the attaching member of Fig. 1;

Fig. 3 is a plan view of the attaching member of Fig. 1 assembled with a socket member onto a supporting member;

Fig. 4 is a view in sectional elevation showing the attaching member in position for piercing a supporting sheet for engagement with a socket member;

Fig. 5 is a view in sectional elevation of the attaching member completely assembled with a socket member, and a stud member assembled in the socket member; and Fig. 6 is a view in section taken on line 6—6 of Fig. 5.

Referring to the drawing, there is illustrated a snap fastener socket assembly 10, comprising a socket member 12 and an attaching member 14 which are adapted to be assembled on opposite sides of a supporting sheet 16, for snapping engagement with a stud 18.

In the illustrated embodiment, the socket member 12 comprises a base 20, having an inwardly turned edge portion 22, which terminates in spaced relation to the base forming a peripheral recess 24. A central stud-receiving portion is provided in the base which may comprise an upstanding tubular portion 26 having a lower end 28 with resilient stud-engaging segments 30 partially restricting the stud-receiving opening 32, and an upper end 34 which extends a substantial distance above the uppermost portion of the inwardly turned edge 22. An inclined camming portion 36 is provided on the base for a purpose to appear hereinafter, which is connected to the tubular portion at the upper end 34, and extends downwardly and outwardly therefrom, leading to the recess 24.

The attaching member 14 is formed of a single piece of molded synthetic organic plastic, preferably of a thermoplastic of the polyamide type, since such plastics are capable of withstanding relatively high temperatures, and yet are sufficiently strong and resilient to be attached to the socket member as will be described hereinafter. In some applications, other types of plastics may be used, such as cellulose acetate, cellulose acetate butyrate, vinyl, styrene or methacrylate resins. The composition and method of manufacture and molding of such plastics are well known in the art, and need not be described here since such methods do not form part of the present invention.

The attaching member 14 preferably comprises a solid body or cap portion 38 and a series of attaching prongs 40 which extend downwardly therefrom. The prongs 40 have pointed ends 42 for piercing the supporting sheet during attachment, and are joined to the base in spaced relation to the outer edge thereof, leaving a rim portion 44 having a smooth under-surface 46 disposed about said prongs. A cylindrical recess 48 is provided in the bottom of the base centrally of the prongs to receive a portion of the socket member as will appear hereinafter.

To assemble the parts on the supporting sheet 16, the socket member and the attaching member are aligned on opposite sides thereof, and forced together so that the pointed ends 42 of the prongs pierce the supporting sheet and contact the socket member on the inclined camming portion 36. As the parts are forced further together, the prongs 40 turn outwardly on the camming surface into the recess 24. It has been found desirable in some cases to make the prongs 40 long enough so that the ends 42 contact the bottom of the recess before the parts are completely assembled. With this construction the ends of the prongs mash into the recess and provide a bulbous end which spreads laterally during the final portion of the attaching operation thereby increasing the holding power of the prongs (see Fig. 6).

During the assembly operation, the upper end 34 of the tubular portion 26 enters the recess 24, pushing the supporting sheet 16 against the bottom of the recess, and the undersurface 46 of the rim 44 pushes the intervening portion of the supporting sheet against the uppermost portions of the inwardly turned edge 22, so that the supporting sheet 16 is securely held between the attaching member and the socket member.

Although the attaching member ordinarily has adequate holding power when attached at room temperature, for some applications and with some types of plastic it may be desirable to perform the attachment at an elevated temperature to prevent any possibility of elastic spring back of the plastic prongs.

The use of plastic for such attaching prongs is particularly advantageous for reasons of appearance, since coloring in such plastic materials extends throughout the body of the article, and minor surface scratches do not damage the finish as is the case where the color is provided by a surface coating. The advantage is particularly evident where the article to which the fastener is attached is to be subjected to laundering, which would eventually destroy metal coatings, but does not affect the appearance of the plastic attaching member.

Another advantage of the device is its adaptability to a great variety of shapes and designs, which are much more easily and cheaply obtained with plastic than with metal. It is possible to mold a one-piece attaching member having a relatively large solid base, and yet have the prongs positioned to engage a small socket. This is possible with sheet metal attaching members only by forming the member of several pieces, which necessitates an assembly operation, or by attaching the prongs to the edge of the base, and extending them inwardly along the bottom of the base and then downwardly, which would require the use of an extremely large blank.

The weight of the plastic member is also considerably less than metal members of a comparable size. Although the difference in weight is not significant in small sizes, it is important where large decorative attaching members are to be secured to flimsy materials, such as plastic raincoats, where the weight of metal members causes undesirable sagging of the material.

While it is preferred to form the attaching member of polyamide thermoplastic which is capable of withstanding the temperatures of laundering, other types of plastics may be used, provided sufficient strength may be obtained in the prongs to securely engage the socket member.

Although in the illustrated embodiment the attaching member is shown as being utilized to attach a socket member, it will be understood that it may also be used to attach stud members if desired.

Since certain other obvious modifications may be made in the device without departing from the scope of the invention, it is intended that all matter contained herein be interpreted in an illustrative and not in a limiting sense.

I claim:

1. A snap fastener half assembly comprising a fastening member and an attaching member assembled onto opposite sides of a supporting sheet, said fastening member being formed of a single piece of synthetic organic plastic of the polyamide type, and comprising a relatively thick base having a series of flexible attaching prongs with pointed ends extending downwardly therefrom, said prongs being integral with the base and being joined thereto inwardly from the edge thereof and decreasing in both width and thickness toward the pointed ends, and fastener member comprising a sheet metal base having a central fastening portion and a prong-engaging portion disposed about the fastening portion, said prongs extending through said supporting sheet and into engagement with said prong-engaging portion.

2. A snap fastener socket assembly comprising a socket member and an attaching member assembled onto opposite sides of a supporting sheet, said fastening member being formed of a single piece of synthetic organic plastic of the polyamide type and comprising a solid base having a series of flexible attaching prongs extending downwardly therefrom, said prongs being integral with the base and decreasing in both width and thickness toward the ends, said base having a recess disposed therein centrally of said prongs, said socket member comprising a base having a central tubular stud-receiving portion and a prong-engaging portion disposed about the stud-receiving portion, one end of said tubular stud-receiving portion being adapted to enter the recess in the attaching member base when the parts are assembled, said prongs extending through said supporting sheet and into engagement with said prong-engaging portion.

3. A snap fastener socket assembly, comprising a socket member and an attaching member assembled onto opposite sides of a supporting sheet, said attaching member being formed of a single piece of synthetic organic plastic of the polyamide type and comprising a base and a series of integral attaching prongs extending downwardly therefrom, said prongs originally having pointed ends and tapering in both width and thickness toward said pointed ends, said socket member comprising a base having a central fastening portion and an inwardly curled periphery forming a prong-receiving recess, said prongs piercing said sheet with the ends disposed in said recess, said prongs being mashed by contact with the bottom of the recess to provide a bulbous end disposed in said recess to retain the socket and attaching member in assembly.

4. A snap fastener socket assembly, comprising a socket member and an attaching member assembled onto opposite sides of a supporting sheet, said attaching member being formed of a single piece of synthetic organic plastic and comprising a base and a series of integral attaching prongs extending downwardly therefrom, said socket member comprising a base having a central fastening portion and an inwardly curled periphery forming a prong-receiving recess, said plastic material of which the attachment member is formed being sufficiently rigid to enable said prongs to pierce said sheet so that the ends are disposed in said recess yet being sufficiently plastic and deformable to allow said ends to be mashed by contact with the bottom of the recess to provide a laterally extending bulbous end disposed in the recess to retain the socket and attaching member in assembly.

WALTER I. JONES.

References Cited in the file of this patent

UNITED STATES PATENTS

| Number | Name | Date |
|---|---|---|
| 2,256,850 | Purinton | Sept. 23, 1941 |
| 2,327,554 | Purinton | Aug. 24, 1943 |
| 2,357,637 | Drypolcher | Sept. 5, 1944 |
| 2,402,287 | Kearns | June 18, 1946 |
| 2,510,693 | Green | June 6, 1950 |